April 10, 1934.     M. DESERVI     1,954,348
ORNAMENTATION FOR AN AUTOMOBILE BODY
Filed Sept. 9, 1931
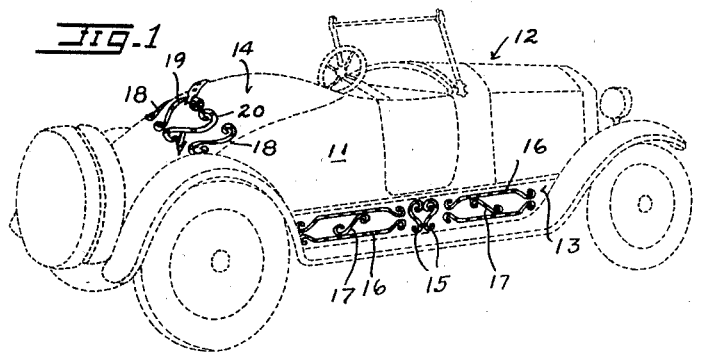
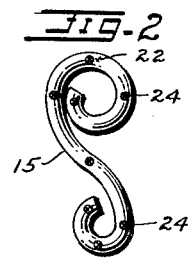
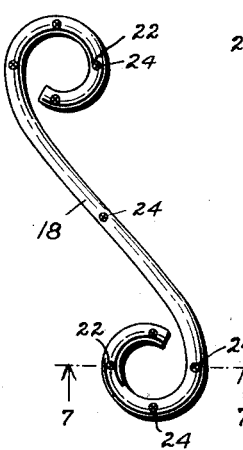
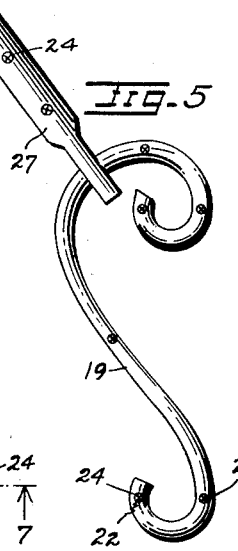
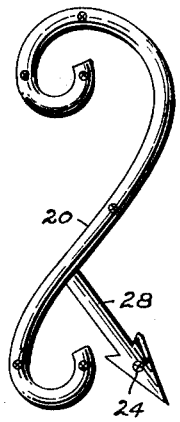
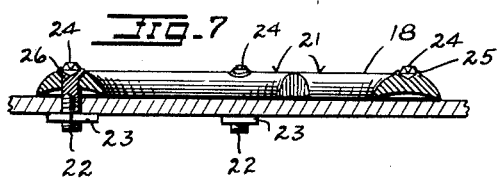
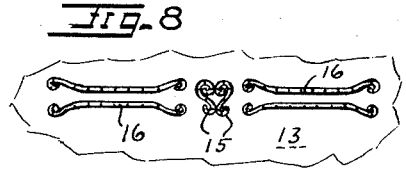
INVENTOR.
MARIO DESERVI
BY Henry N. Youn.
ATTORNEYS.

Patented Apr. 10, 1934

1,954,348

UNITED STATES PATENT OFFICE 1,954,348

ORNAMENTATION FOR AN AUTOMOBILE BODY

Mario Deservi, Oakland, Calif.

Application September 9, 1931, Serial No. 561,977

3 Claims. (Cl. 41—34)

The invention relates to a means for exteriorly ornamenting the body of an automobile or similar vehicle.

An object of the invention is to provide an ornamentation means for mounting on an automobile body as an embossment thereof.

Another object is to provide for a particularly close fitting engagement with the body of the ornamentation elements.

A further object of the invention is to provide ornamentation elements for combination to provide any one of a plurality of designs on a body surface to be decorated.

Yet another object is to provide for the inclusion of light-refracting crystals or brilliants in the ornamentation provided.

A general object is to provide a particularly attractive and effective ornamentation of the character described and for application as an attachment to existing automobile body structures.

The invention possesses other objects and features of advantage, some of which, with the foregoing, will be set forth or be apparent in the following description of typical embodiments of the invention which are illustrated in the accompanying drawing in which, Figure 1 is a perspective view showing the application of ornamentation embodying the present invention to the body of an automobile.

Figures 2 to 6 inclusive are enlarged face views of ornamentation elements shown in Figure 1.

Figure 7 is an enlarged section at 7—7 in Figure 4, and discloses the method of mounting an ornamentation element on a sheet-metal body wall of the vehicle.

Figure 8 is a face view of an alternative design formed with the ornamentation elements shown in Figures 2 and 3.

As particularly disclosed in Figure 1, ornamentation embodying my invention is applied to certain exterior surfaces of the body 11 of an automobile 12. In the present instance one unitary ornamentation design is mounted at a side apron 13 of the body and another design is provided on the back wall 14 of the body. The design on the apron 13 is made up of elements 15, 16, and 17, while that on the wall 14 is made up of elements 18, 19 and 20.

All of the various elements 15 to 20 inclusive are preferably formed of strips of more or less resilient material and of crescent cross-section, as is particularly brought out in Figure 7. These strips may be, for example, of aluminum and preferably have their outer, and convex, faces 21 polished to increase their visibility. By reason of the crescent section of the strips providing the said decorative elements, the relatively sharp edges of said elements are arranged for a line engagement with the surface on which they are mounted, and a smooth and uniform mounting of the elements on said surface is thereby assured.

At spaced points along the various elements, fastening members 22 are engaged transversely therethrough for fixing the elements to the body. In the present instance the body portions 13 and 14 are of sheet metal and each said fastener 22 comprises a bolt to extend through the body wall and receive a nut 23 at its inner end. By appropriately tightening up a nut 23 on its bolt, the mounted strip may be laterally flexed against the body wall thereat whereby the strip edges are arranged to provide a sealed jointure with the body. In this manner the decorative elements are made to appear as comprising an integral part of the body and the space beneath each element is sealed against receiving dust or moisture.

In addition to the decorative feature provided by the polished face 21 of each said decorative element, an added attraction is provided through mounting crystals 24 in and along the element. The crystals 24 would preferably be of colored glass or other refracting material, and would preferably be shaped with facets in imitation of precious stones. As herein used, the word crystals is intended to indicate natural or artificial stones such as are sometimes referred to as brilliants. In mounting said crystals in the various strips, the base portions of the crystals are preferably countersunk in the strips, as particularly shown in Figure 7, edges 25 of the crystal-receiving sockets being peened over the crystal edges to secure the crystals in a usual manner.

Preferably, and as shown, bolts 22 are placed at locations where crystals are to be mounted and the bolt heads 26 have crystals 24 mounted therein. By appropriately countersinking the bolt heads 26 and mounting the crystals 24 therein as those directly mounted in the strips, the presence of the bolt is arranged to be completely concealed.

Arrow portions 27 and 28 are provided as integral parts of the elements 19 and 20. When said elements are laterally adjacent with the said arrow portions in alignment, the combination of elements presents a conventional heart pierced by an arrow. As particularly shown in Figure 1, the heart design thus provided is flanked by a pair of complementarily formed elements 18. It is noted that the elements 17 are of the same general shape as the elements 18, but are smaller.

It will now be noted that the disclosed decorative elements are formed to provide scroll embossments of the body portions on which they are mounted and that they may be variously arranged to provide any one of a number of designs. A design made up of the disclosed elements 15 and 16 and for alternative installation of the element assembly in place of the design on the apron 13 is shown in Figure 8. The degree and form of lateral bending of the various strips to provide decorative scroll elements is also, of course, variable, and such variation is understood to lie within the scope of the present disclosure.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In combination with an automobile body, ornamentation means comprising a strip of resilient material of substantially crescent cross-section, and bolt means securing said strip to said body with solely the extreme edges of the strip engaging the body and with the strip flexed across its section whereby to insure a sealed and line contact of the strip edges with the body.

2. In combination with an automobile body, ornamentation means comprising a strip of opaque material for attachment to the body as an embossment, a line of crystals carried by said strip in countersunk relation therein, and a screw engaging transversely through said strip to secure the same to the body, said screw carrying a said crystal of said line thereof.

3. In combination with an automobile body, ornamentation means comprising a strip of metal of substantially crescent cross-section arranged for securing to and against a surface of the body with solely the strip edges engaging said surface, screws extending transversely through the strip in the center line thereof for tensed engagement in the body to secure the strip against said surface in laterally flexed condition for insuring a tight jointure at the strip edges, and light-refracting crystals carried by the said screw heads and said strip in the center line of the strip.

MARIO DESERVI.